United States Patent [19]

Kelley et al.

[11] 3,926,886

[45] Dec. 16, 1975

[54] EPOXY RESIN-AMINE SALT EMULSION COMPOSITION

[75] Inventors: John Joseph Kelley, Willingboro, N.J.; Alan Edward Varker, Philadelphia, Pa.

[73] Assignee: ESB Incorporated, Philadelphia, Pa.

[22] Filed: Mar. 27, 1974

[21] Appl. No.: 455,070

[52] U.S. Cl. ......... 260/29.2 EP; 106/90; 260/47 EN
[51] Int. Cl.² ........................................... C08G 51/24
[58] Field of Search..... 260/29.2 EP, 18 EP, 47 EN; 106/90, 2 H, 59

[56] References Cited
UNITED STATES PATENTS

| | | | |
|---|---|---|---|
| 2,681,901 | 6/1954 | Wiles et al. | 260/47 |
| 3,468,779 | 9/1969 | Slater et al. | 260/29.2 EP X |

*Primary Examiner*—Donald E. Czaja
*Assistant Examiner*—T. Pertilla
*Attorney, Agent, or Firm*—Robert H. Robinson; Anthony J. Rossi

[57] ABSTRACT

A unitary epoxy resin-amine salt emulsion composition has been developed in which the amine salt functions as both an emulsifying agent and a latent curing agent for the epoxy resin emulsion. This composition is used in combination with hydraulic cement which activates the amine salt to cure the composition. The epoxy resin-amine salt emulsion composition is stable when subjected to both freezing and elevated (120°F) temperatures, and when combined with cement, it provides improved tensile and compressive strength compared to commercially available epoxy resin-cement systems.

7 Claims, No Drawings

3,926,886

EPOXY RESIN-AMINE SALT EMULSION COMPOSITION

BACKGROUND OF THE INVENTION

Epoxy resin emulsion-hydraulic cement systems are commercially available building and repair materials. Generally, these systems comprise three or more separate materials including (1) epoxy resin emulsion, (2) curing agent for the epoxy resin, and (3) hydraulic cement. If desired, a filler such as sand may be used, and it may either be premixed with the cement or it may be used as a separate material. At the building or construction site, these materials are mixed and water is added to the mixture to activate the cement. The cured composition has greater tensile and compressive strength compared to cement compositions.

Two problems are often encountered when the epoxy resin emulsion-cement compositions are used at the building or repair site. One problem is the instability of the epoxy resin emulsion which may separate into non-dispersible components. Separation of the epoxy resin emulsion will occur more frequently if the emulsion is subjected to freezing or elevated temperatures. The other problem relates to the mixing of the several materials, particularly the epoxy resin emulsion and the curing agent therefor. The ratio of curing agent to epoxy resin is critical, and the inexpert and/or hurried mixing of these materials at the building site often results in less than optimum results. In addition, many people are allergic to the amine compounds generally used as epoxy resin curing agents.

It is a principal object of this invention to provide a unitary epoxy resin-amine salt emulsion composition which is activated and cured by mixing it with cement. This avoids mixing the epoxy resin and curing agent at the building site, and it provides the optimum ratio of curing agent to epoxy resin. It is also an object of this invention to provide an epoxy resin-amine salt emulsion composition which is stable during storage and which can withstand freeze-thaw conditions as well as elevated temperature storage conditions. In the event that components of the composition do separate during storage, they can readily be remixed to provide the unitary composition. Additional objects of this invention will be apparent to persons skilled in the art after reading the description which follows.

SUMMARY OF THE INVENTION

It has been discovered that a unitary epoxy resin-amine salt emulsion composition which is stable after freezing and during high temperature storage can be prepared. When subsequently mixed with hydraulic cement, the latent amine salt curing agent is activated to cure the epoxy resin, forming an epoxy resin-cement composition having excellent tensile strength and compressive strength properties. The compositions can be formulated to accentuate storage stability with some sacrifice in strength, or exceptional strength can be provided with some sacrifice in stability.

The epoxy resin-amine salt emulsion composition contains a liquid epoxy resin mixed with an amine formate or acetate which functions as both an emulsifier and a curing agent for the epoxy resin. It is preferred that the amine salt be derived by reacting formic acid or acetic acid with a liquid aliphatic ether diamine having the following formula:
$R_1-O-R_2-NH-R_3-NH_2$ wherein $R_1$ is a branched or linear higher alkyl radical having at least 8 carbon atoms, and $R_2$ and $R_3$ are linear lower alkylene radicals having from 2 to 4 carbon atoms. It has been found that the formate salt has excellent storage stability and provides good strength properties. In some cases, the acetate salt provides even better strength properties than the formate, but it is not as stable, particularly during high temperature storage.

While preparing the amine salts, it was discovered that they can function effectively as cationic emulsifiers for epoxy resins in water. As a result, the emulsion system requires only epoxy resin, amine salt and water. If desired for greater stability, an additional emulsifier may be included in the composition. The emulsions employing the formate salt have been found to be particularly stable during storage, capable of withstanding several freeze-thaw cycles and elevated temperature (120°F) storage. Though the emulsion may separate into two liquid layers, they are readily remixed to form a stable emulsion. It has also been found that an emulsion employing an amine acetate emulsifier separates upon elevated temperature storage, forming a solid gel phase which cannot be remixed.

When the epoxy resin-amine salt emulsion composition is mixed with a hydraulic cement, the amine salt reacts with the alkaline cement which releases the amine to perform its function as a curing agent for the epoxy resin. If desired, the cement can be mixed with a filler such as sand. Epoxy resin-amine salt emulsion compositions have been mixed with Portland cement/sand blends and specimens prepared for strength testing. Compositions employing a formate salt emulsifier and curing agent yielded compressive and tensile strengths superior to a commercially available epoxy resin emulsion-cement composition. The acetate salt emulsifier and curing agent provided even greater tensile and compressive strength compared to the formate.

DESCRIPTION OF PREFERRED EMBODIMENTS

The amine salts useful in the compositions of this invention were prepared by reacting a liquid aliphatic ether diamine of the formula $R_1-O-R_2-NH-R_3-NH_2$ with a carboxylic acid selected from formic acid and acetic acid. It is generally preferred that $R_1$ be a higher alkyl radical having at least 8 carbon atoms, and it may be either linear or branched. $R_2$ and $R_3$ are linear lower alkylene radicals having from 2 to 4 carbon atoms. A tridecyl ether diamine where $R_1$ is mainly a tetramethyl nonyl radical and $R_2$ and $R_3$ are linear propylene radicals has been found to be particularly effective.

The reaction with the carboxylic acid to form the amine salt is carried out by dispersing the amine in either water or a solution of an emulsifier in water, and then slowly adding either the acetic or formic acid until neutralization is complete. It is generally preferred to add a slight excess of the carboxylic acid to insure complete neutralization. This reaction is exothermic and the reaction mixture must be allowed to cool to room temperature before adding the epoxy resin. After cooling, the epoxy resin is slowly added to the amine salt composition with agitation to produce a unitary epoxy resin-amine salt emulsion.

The epoxy resins which are used to prepare the compositions of this invention are liquid at room temperature and can be cured at room temperature. These epoxy resins must have sufficiently low viscosity, preferably below twenty thousand centipoises, to render them dispersible in water solutions containing an emulsifier to disperse the resin. The epoxy resins used in the compositions of this invention contain reactive epoxy

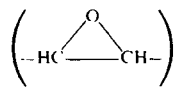

groups which react at room temperature with compounds having active hydrogen atoms, such as amines. Most epoxy resins are made from epichlorohydrin and bisphenol A [bis (4-hydroxyphenyl) dimethyl methane] by a condensation reaction. The major component of most liquid epoxy resins is the molecule made by combining one bisphenol A molecule with two epichlorohydrin molecules. In order to obtain a liquid resin, the size of the molecule must be kept small, and a great excess of epichlorohydrin must be used to carry out the reaction. Condensation products of epichlorohydrin with other polyhydric alcohols may be used, provided that there is a low degree of polymerization to obtain a liquid resin. Examples of other polyhydric alcohols or phenols which can be used to prepare liquid epoxy resins are bisphenol F (4,4' - dihydroxybiphenyl methane), substituted bisphenol A diphenolic acid, low molecular weight phenol formaldehyde resins, aliphatic diols, and aliphatic triols such as glycerine.

While preparing the amine salts, it was discovered that they could function effectively as cationic emulsifiers for the liquid epoxy resins in an aqueous system. In particular, the amine formate provides an epoxy resin emulsion which is very stable and withstand freezethaw cycles as well as elevated temperature storage. After storage at elevated temperature (120°F) for two weeks, an emulsion system using an amine formate separated into two liquid layers which were redispersible by stirring, whereas the same system using an amine acetate formed a solidified layer which could not be redispersed.

The compositions of this invention are stable emulsions consisting essentially of water, amine salt and liquid epoxy resin. In some cases, the stability of the emulsion can be improved by incorporating an additional emulsifier which is compatable with the amine salt. This can be done quite conveniently by preparing the amine salt in an aqueous solution containing the emulsifier which may be either an anionic or non-ionic emulsifier. Examples of emulsifiers which can be used are non-ionic compounds such as aliphatic phenol ethylene oxide polyethers and aliphatic alcohol ethylene oxide polyethers, and anionic emulsifiers such as ammonium and alkali metal salts of alkyl alcohol polyether mineral acid esters.

The amount of each component present in the epoxy resin-amine salt composition may vary over a fairly wide range, provided however, there must be sufficient amine salt emulsifier present to form a stable emulsion. It is generally preferred that the amine portion of the amine salt be present in an amount sufficient to react with about 40–80 percent of the reactive epoxy groups present in the epoxy resin, i.e. a 40–80 percent stoichiometric amount of reactive amine groups per reactive epoxy group. There may be excess carboxylic acid (formic or acetic) present in the composition which was unreacted in the preparation of the amine salt. Additional emulsifiers may also be present to improve the stability of the emulsion composition. In particular, an emulsifier commercially available as Abex 18-S which is belived to be an ammonium or alkali metal salt of the mineral acid ester of an alkyl alcohol polyether, has been found to improve the freeze-thaw stability and elevated temperature stability of the emulsion. If used, the additional emulsifier may be present in amounts ranging up to about 15% by weight of the emulsion composition, whatever is necessary to provide the desired stability.

The emulsion compositions of this invention are particularly useful when combined with a hydraulic cement and a filler if desired. The alkaline cement reacts with the amine salt which enables the amine to function as a curing agent for the epoxy resin. It is believed that one of the reasons for obtaining improved strength characteristics when these emulsions are mixed with hydraulic cement is the uniform dispersion of the amine salt throughout the epoxy resin which provides a more complete cure of the epoxy resin.

The following examples demonstrate the preparation of the emulsions of this invention and their utility when combined with hydraulic cement:

EXAMPLE I 36 parts by weight of a branched aliphatic ether diamine having the formula $R_1-O-R_2-NH-R_3-NH_2$ with $R_1$ being a tetramethyl nonyl radical and $R_2$ and $R_3$ being a linear propylene radical (commercially available as Adogen 583) were mixed with 97 parts by weight of water. This solution was neutralized by slowly adding 10 parts by weight of 97 percent formic acid. The reaction was exothermic and a gel was formed. The gel was allowed to cool to room temperature with slow agitation. After cooling, 100 parts by weight of a liquid epoxy resin which was a bisphenol A diglycidyl ether (commercially available as Epirez 510) was blended into the gel. The resin was slowly poured into the gel where it was blended with a high speed mechanical agitator to produce a smooth, creamy paste. It required mixing for about 1 to 2 minutes to obtain uniform consistency. The resultant emulsion was stored for several months at room temperature without separation. Some samples were stored for 2 weeks at 120°F., and though the emulsion separated into two liquid layers, they were easily remixed by hand stirring to form the emulsion.

292 parts by weight of the emulsion was diluted with 116.8 parts by weight of water, and 2434 parts by weight of a Portland cement/sand mixture (18/82 mixture commercially available as Rezklad cement-sand filler) was blended into the diluted epoxy resin emulsion with vigorous stirring for 1 to 2 minutes. The fresh paste was formed into one inch high cylinders of one inch diameter for compression tests. After 24 hours, the epoxy resin/amine formate/cement composition developed a compressive strength of 780 psi. Samples of the emulsion which had been stored at 120°F. for two weeks yielded a compressive strength of 402 psi after 24 hours and 2,063 psi after 28 days when blended with the Portland cement/sand mixture.

EXAMPLE II

Batches of epoxy resin-amine salt emulsion and cement/sand mix were prepared in a five gallon pail attached to a motor driven rotating platform, simulating equipment that would be used at a building site. A mixer paddle, attached to the support stand, was suspended in the pail and folded the paste as the pail rotated. The dry components, cement and sand in 18/82 ratio, were mixed for 30 seconds, and then the epoxy resin-amine salt emulsion was added to the dry mix over a 30 second period with the pail rotating. The paste was mixed for another minute to obtain a uniform composition, and then it was formed into specimens for testing. FIG. 8 tensile strength briquettes were formed according to ASTM test method C307-61, and one inch high cylinders of one inch diameter were used for compression tests.

The epoxy resin emulsion was prepared in accordance with the procedure described in Example I. One emulsion was made using an amine formate emulsifier and another emulsion used an amine acetate. Tridecyl ether diamine (Adogen 583) as used in Example I was reacted with the formic acid and acetic to form the amine salt. A 60 percent stoichiometric ratio was used to prepare the amine acetate with the acetic acid present in excess. The amine formate was prepared in accordance with Example I. The liquid epoxy resin wsa a bisphenol A diglycidyl ether for both emulsions.

Several specimens were used for each strength test and the following mean values were calculated:

| Emulsifier | Conditioning Time | Tensile Strength (psi) | Compressive Strength (psi) |
|---|---|---|---|
| Amine Formate | 24 hrs. | 149 | 782 |
| | 14 days | 498 | 4460 |
| | 28 days | 417 | 3810 |
| Amine Acetate | 24 hrs. | 274 | 1608 |
| | 14 days | 656 | 5320 |
| | 28 days | 768 | 4885 |

These results indicate that the amine acetate emulsion, which is less stable, did yield higher tensile and compressive strengths.

EXAMPLE III

An epoxy resin-amine formate emulsion was prepared in accordance with the procedure of Example I, with the exception that an anionic emulsifier (commercially available as Abex 18-S) was added to the emulsion. 50 parts of 97 percent by weight formic acid were slowly added to 402 parts of water with stirring. Then 180 parts of tridecyl ether diamine were added slowly with stirring. 166 parts of the anionic emulsifier were added to the gel which formed while continuing to stir the gel. After cooling the gel to room temperature, 500 parts of bisphenol A diglycidyl ether epoxy resin were blended with the amine formate until a smooth white emulsion formed. 155.5 parts of this emulsion were diluted with 53 parts of water and blended with 1,217 parts of Portland cement/sand mixture (18/82). A portion of the epoxy resinamine formate emulsion was stored for two weeks at 120°F. The emulsion separated, but there was no gelled phase, and the emulsion was completely remixed to form a homogeneous emulsion which was also mixed with the Portland cement/sand mixture.

Several strength test specimens were prepared for each test and the mean values were calculated as follows:

| Emulsifier | Conditioning Time | Tensile Strength (psi) | Compressive Strength (psi) |
|---|---|---|---|
| Amine Formate (before storage at 120°F.) | 24 hrs. | 124 | 787 |
| | 14 days | 661 | 3172 |
| | 28 days | 487 | 3810 |
| Amine Formate (after storage at 120°F.) | 24 hrs. | 150 | 805 |
| | 14 days | 376 | 2963 |
| | 28 days | 342 | 2596 |

The stabilizing effect of the additional emulsifier is demonstrated by the compressive strength which was nearly equal to the fresh emulsion after 14 days conditioning.

Having completely described this invention what is claimed is:

1. An epoxy resin-amine salt in water emulsion composition essentially of water, a liquid epoxy resin comprising a condensation product of epichlorohydrin with a polyhydric alcohol or phenol and an amine salt reaction product obtained by reacting a carboxylic acid selected from formic acid and acetic acid with a liquid aliphatic ether diamine having the formula $$R_1-O-R_2-NH-R_3-NH_2$$

wherein $R_1$ is a branched or linear higher alkyl radical having at least 8 carbon atoms, and $R_2$ and $R_3$ are linear lower alkylene radicals having from 2 to 4 carbon atoms, with the amine salt present in an amount sufficient to react with about 40–80 percent of the reactive epoxy groups present in the liquid epoxy resin.

2. A composition in accordance with claim 1 in which the liquid epoxy resin is a diglycidyl ether of bisphenol A.

3. A composition in accordance with claim 1 in which $R_1$ is a tetramethyl nonyl radical, and $R_2$ and $R_3$ are propylene radicals.

4. A composition in accordance with claim 3 in which the carboxylic acid is formic acid.

5. A composition in accordance with claim 3 in which the carboxylic acid is acetic acid.

6. A composition in accordance with claim 2 in which $R_1$ is a tetramethyl nonyl radical and $R_2$ and $R_3$ are propylene radicals.

7. A composition in accordance with claim 1 in which a nonionic or anionic emulsifier is present in an amount up to about 15 percent by weight of the composition.

* * * * *